United States Patent [19]
Locke et al.

[11] Patent Number: 5,756,020
[45] Date of Patent: May 26, 1998

[54] METHOD FOR PRODUCING SOLUTION DYED ARTICLES FROM THERMOPLASTIC POLYMERS

[75] Inventors: John S. Locke, Seaford, Del.; Paul Sheldon Pearlman, Thornton, Pa.; Caroline Tjhen Shibata, Newark; Kenneth J. Tadler, Wilmington, both of Del.

[73] Assignee: E. I. du Pont de Nemours and Company, Wilmington, Del.

[21] Appl. No.: 811,555

[22] Filed: Mar. 4, 1997

Related U.S. Application Data

[63] Continuation of Ser. No. 629,863, Apr. 9, 1996.

[51] Int. Cl.$^6$ .................... B29C 47/92; D01F 1/04
[52] U.S. Cl. .................... 264/40.7; 264/78; 264/211
[58] Field of Search .................... 264/40.7, 78, 211

[56] References Cited

U.S. PATENT DOCUMENTS

| | | | |
|---|---|---|---|
| 3,745,061 | 7/1973 | Champaneria et al. | 428/398 |
| 4,045,529 | 8/1977 | Phillips et al. | 264/75 |
| 4,684,488 | 8/1987 | Rudolph | 264/411 |
| 4,848,915 | 7/1989 | Fintel | 366/76.2 |
| 4,919,872 | 4/1990 | Fintel | 264/103 |
| 5,236,645 | 8/1993 | Jones | 264/78 |
| 5,439,623 | 8/1995 | Fintel | 264/40.1 |

FOREIGN PATENT DOCUMENTS

| | | |
|---|---|---|
| 646 409 | 4/1995 | European Pat. Off. |
| 3523661 | 1/1987 | Germany . |
| 1119199 | 7/1968 | United Kingdom . |

OTHER PUBLICATIONS

AATCC Committee, CMC: Calculation of Small Color Differences for Acceptability, AATCC Technical Manual, pp. 321–324, 1991.

Roderick McDonald, Acceptability and Perceptibility Decisions Using the CMC Color Difference Formula, Quality Control, vol. 20, No. 6, pp. 31–37, Jun. 1988.

*Primary Examiner*—Leo B. Tentoni

[57] ABSTRACT

A process for producing solution dyed extruded articles from thermoplastic polymer wherein each colorant is contained in a separate color concentrate and each concentrate is fed to an extruder through a separate gravimetric feeder where the concentrates are melt blended with the thermoplastic polymer prior to extruding.

8 Claims, 1 Drawing Sheet

5,756,020

METHOD FOR PRODUCING SOLUTION DYED ARTICLES FROM THERMOPLASTIC POLYMERS

This is a continuation of application Ser. No. 08/629,863, filed Apr. 9, 1996, now abandoned, which claims the benefit of provisional application Ser. No. 60/004,405, filed Sep. 28, 1995.

FIELD OF THE INVENTION

This invention relates to a process for producing solution dyed extruded articles from thermoplastic polymers wherein each colorant is contained in a separate color concentrate and fed by a separate gravimetric feeder to an extruder.

BACKGROUND OF THE INVENTION

Thermoplastic polymers including, but not limited to, nylon polypropylene and polyester, are used in many applications. Often the polymers are melted and then extruded into articles such as molded parts or fibers.

One method for coloring these articles is to solution dye them, that is, by melt blending colorant (pigment or dye) with the thermoplastic polymer prior to extruding. Typically, such colorant is added to the thermoplastic polymer in the form of a master batch wherein all of the pigments, dyes (or a combination thereof) necessary to achieve the desired color in the finished article are dispersed in a polymeric matrix of a melt processable polymer. The melt processable polymer used in the master batch may be the same or different from the thermoplastic polymer which is to be colored and used to make the colored extruded article.

Color master batches are usually in pellet form and are introduced to the extruder through a gravimetric feeder. However, strands of color master batch have also been used to solution dye the extruded article (U.S. Pat. Nos. 5,439,623; 4,919,872; 4,848,915, German Patent DE 3,523,661 and British Patent GB 1,119,199).

Color master batches have several disadvantages. It is difficult to adjust the color of the articles being extruded (if color is off aim) without completely reformulating the color master batch. Also, a separate master batch is required for each desired color of extruded article.

SUMMARY OF THE INVENTION

The present invention provides an improved process for making solution dyed extruded articles wherein each colorant is contained in a separate color concentrate and each color concentrate is fed to the extruder through a separate gravimetric feeder. Thus many differently colored extruded articles can be made by feeding to the extruder relatively few differently colored color concentrates in different proportions. Color errors in extruded articles may be easily corrected by adjusting the flow rate of one or more of the color concentrate gravimetric feeders.

The process details of this invention include first feeding a thermoplastic polymer to the extruder. This is the polymer which will be colored. Next (or simultaneously) at least two differently colored color concentrates are fed to the extruder. Each of these color concentrates is fed from a separate gravimetric feeder and each color concentrate consists essentially of about 0.1 to about 70 weight percent of a single colorant (pigment or dye) dispersed in about 30 to about 99.9 weight percent of a melt processable polymeric matrix. The color concentrates and the thermoplastic polymer are melted and mixed in order to form an extrudable mixture. This mixture is then extruded into an extruded article such as molded parts or fibers.

DETAILED DESCRIPTION OF THE INVENTION

Figure 1:
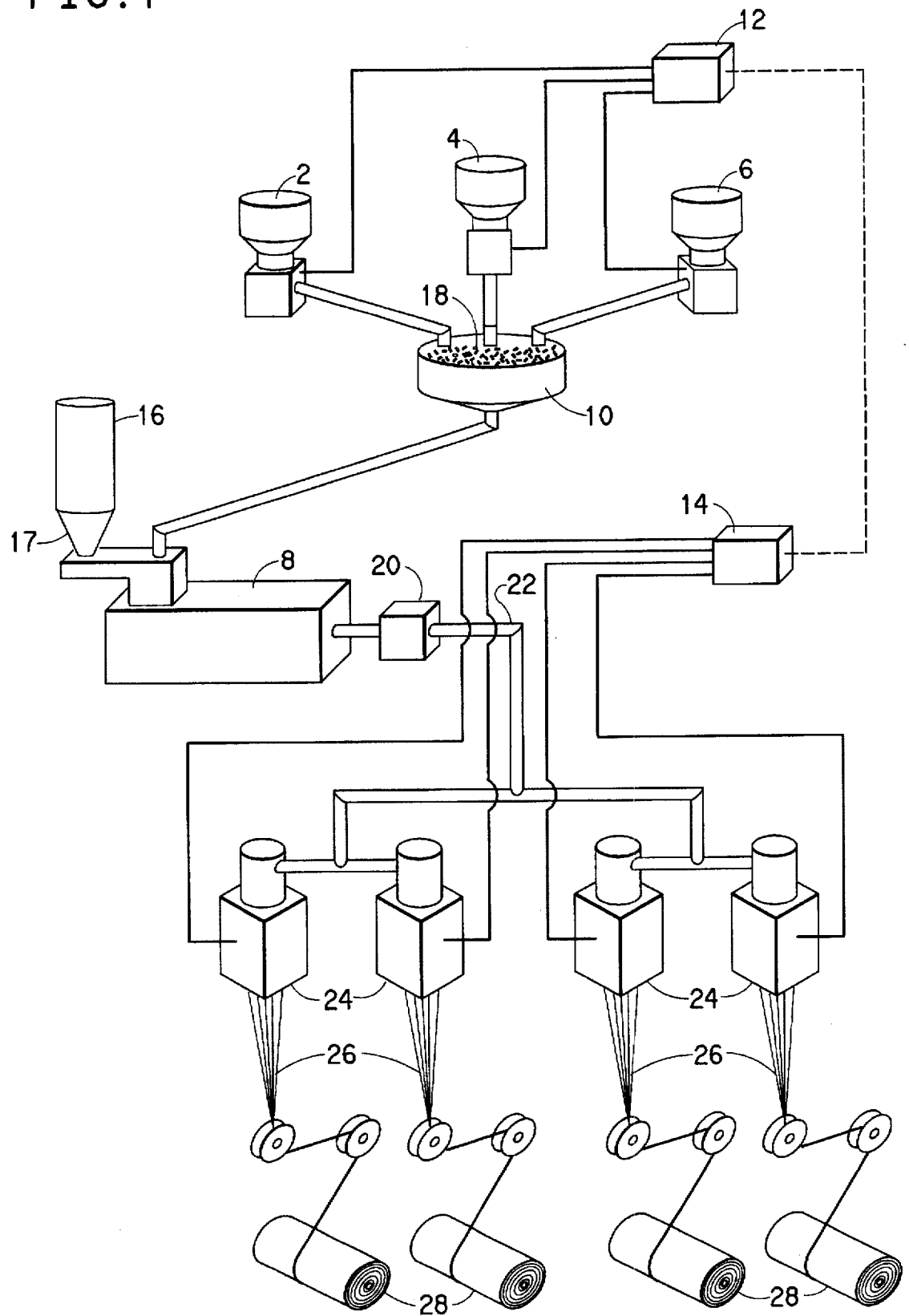
FIG. 1 is a schematic depiction of a preferred embodiment of this invention.

FIG. 1 shows an embodiment of this invention wherein colored fibers are produced. Anyone skilled in the art would immediately recognize that extruded articles other than fibers, such as molded parts, may easily be produced by this process.

Referring to FIG. 1, a plurality of gravimetric pellet feeders 2, 4, 6, typically 3 to 8 feeders, are arranged so as to feed an extruder 8 through a transfer tube 10. Each gravimetric pellet feeder contains pellets of a color concentrate consisting essentially of a single colorant (pigment or dye) dispersed in a polymeric matrix of at least one melt processable polymer. The polymeric matrix may be of more than one melt processable polymer blended or copolymerized. Melt processable polymers suitable for use in these single colored color concentrates include, but are not limited to, nylon, polypropylene, polyester and copolymers and blends thereof. Preferably the melt processable polymer is nylon. Most preferably, it is nylon 66, nylon 6, or a copolymer or blend thereof. The melt processable polymer used in the color concentrates may be the same or different from the thermoplastic polymer to be colored and used to make the extruded article.

The size and shape of the color concentrate pellets is not critical so long as the gravimetric feed rate can be accurately controlled so as to produce extruded articles having acceptable color uniformity. Typical color concentrate pellets are cylindrical in shape and about 0.098 inches in diameter x about 0.125 inches in height. Micropellets of about 0.045 inches in diameter and 0.05 inches in height also work satisfactorily. Color concentrate pellets contain about 0.1 to about 70 weight percent pigment or dye and about 30 to about 99.9 weight percent polymeric matrix, based on the total weight of the pellets. The pellets may also contain minor amounts of lubricants, processing aids, stabilizers, etc. However, it is essential for this invention that the color concentrate pellets contain only one colorant. Otherwise, the full benefits of the invention (e.g. making adjustments in order to return to on-aim color and making many different colors from relatively few differently colored color concentrates) can not be realized.

Suitable gravimetric feeders 2, 4, 6 for this process should have the ability to accurately feed pellets at a rate of less than five pounds per hour, preferably less than one pound per hour, such as the KQX feeder available from KTRON North America of Pitman, N.J.

A commercially available control system 12 (such as the K-Commander available from KTRON North America of Pitman, N.J.) is used to turn on and off the gravimetric feeders and to control the rate at which color concentrate pellets are fed to the extruder. The control system contains the color recipe for the colored article being extruded. By "color recipe" it is meant the rate (pounds per hour) of each color concentrate which must be fed to the extruder in order to make the article with the correct color (lightness, chroma and hue).

Optionally, the gravimetric control system 12 may be interfaced to the extruder control system 14 so that pellet feed rate may be adjusted for fluctuations in extrusion rate.

The color (lightness, chroma and hue) of the finished article may be monitored on-line with closed loop feedback (not shown) to the gravimetric feeder controller 12 so that color fluctuations may be compensated for immediately, or the color of the finished article may be monitored off line and the appropriate correction factors entered manually or electronically into the gravimetric feeder control system.

The process for producing solution dyed articles entails first introducing thermoplastic polymer from a source into the extruder. Thermoplastic polymers include, but are not limited to, nylon, polypropylene, polyester and copolymers and blends thereof. Preferably, the thermoplastic polymer is nylon. Most preferably, it is nylon 66, nylon 6, or a copolymer or blend thereof. Nylon copolymers containing from about 1 to about 4 weight percent of the sodium salt of 5-sulfoisophthalic acid are particularly useful. The source of the thermoplastic polymer might be polymer flake 16 added through a separate gravimetric feeder 17 (as shown) or molten polymer may be pumped through a transfer line from a continuous polymerizer or a second extruder (not shown). Color concentrate pellets 18, each pellet containing only one colored pigment or dye, and each differently colored color concentrate pellet contained in a separate gravimetric feeder, are fed through the transfer tube 10 from at least two of the gravimetric feeders 2, 4, 6 at a rate controlled by the gravimetric feeder control system 12 as determined by the desired color of the extruded article and the extrusion rate. The color concentrate pellets and the thermoplastic polymer (if not already melted) are melted and mixed in the extruder. The mixture is then extruded into a colored article of proper chroma, hue and lightness.

In the embodiment shown in FIG. 1, the mixture is extruded into fibers. Pump 20 pumps the mixture through transferline 22 to spinning machine 24 where fibers 26 are formed and then wound onto packages 28.

The color uniformity (as measured by the color difference delta E CMC(2:1)) within fiber packages made with this process compares well with that of fibers made from a conventional multi-colorant master batch containing more than one pigment. In order to have acceptable color uniformity, fiber packages should have a mean delta E CMC(2:1) of 0.3 or less.

TEST METHOD

Color uniformity was measured by determining the mean delta E CMC(2: 1) through a fiber package. The lower the mean delta E CMC(2:1), the better the color uniformity. Delta E CMC(2:1) is a widely used color difference measurement. Details of the calculation of delta E CMC(2:1) for color difference can be found in AATCC Test Method 173-1990 (AATCC Technical Manual, 1991) and is also described in *Text. Chem. Color.*, June 1988, Vol. 20, No. 6, pp. 31–36.

Color uniformity through a fiber package was evaluated by obtaining a series of approximately 20 samples spaced evenly through the fiber package. Since the winding time for a package was approximately 20 minutes, each fiber sample was indicative of the color uniformity from minute to minute. Each fiber sample was carefully wound onto a 3 inch x3 inch card. Sample cards were measured in a DataColor International CS-5 spectrophotometer equipped with Chroma-Calc (R) software. A composite standard was made by measuring the color of 9 of the 20 samples (essentially every other sample). The color of each of the 20 samples was then measured and compared to this composite standard. The delta E CMC(2:1) for each sample was calculated by the software and the mean delta E CMC(2:1) was reported.

EXAMPLE

The color uniformity of fibers produced by single colored color concentrates via the multiple gravimetric feeder process of this invention (also called multi-feeder process) was compared to that of fibers made with the conventional multi-color pigment master batch process using a single gravimetric feeder.

Nylon 66 hollow filament bulked continuous fibers colored "Weathered Tan" were made according to each process so as to contain about 0.46 weight percent total pigment, based on weight of fiber. Of this amount, approximately 0.0133 weight percent was black pigment, 0.2263 weight percent was white pigment, 0.1632 weight percent was yellow pigment and 0.0612 weight percent was red pigment.

In the process of this invention, four separate single colored color concentrates were used (black, white, yellow and red). The polymeric matrix used for each color concentrate was a mixture of nylon 6 and ELVAMID 8063 (available from DuPont Co. of Wilmington, Del.) which is a terpolymer of nylon 6/6,6/6,10. Each color concentrate was contained in a separate gravimetric feeder. The feed rates for the gravimetric feeders were set to 0.70 pounds per hour for the feeder containing the black concentrate, 2.97 pounds per hour for the white, 0.80 pounds per hour for the red and 4.28 pounds per hour for the yellow.

The nylon 66 polymer to be colored and used to make the fibers was actually a copolymer containing approximately 3 weight percent of the sodium salt of 5-sulfoisophthalic acid. The total extruder throughput (color concentrates plus nylon 66 copolymer) was approximately 525 pounds per hour. The mixture of color concentrates and nylon 66 copolymer was extruded through a spinneret as described in U.S. Pat. No. 3,745,061 into filaments having a square cross-section and four continuous voids, one at each corner. The filaments were then drawn, air jet bulked and the resulting fibers wound onto packages. The fiber bundle was 1245 denier.

In the comparative example, one colorant masterbatch containing all 4 pigments (black, white, yellow and red) dispersed in a polymeric matrix of nylon 6 and ELVAMID 8063 was fed to the extruder through a single gravimetric feeder at a rate of approximately 1.5% of the total flow rate of the extruder. The nylon 66 copolymer and the remainder of the process was the same as that used above in the multi-feeder process of this invention. The resulting fiber bundle was 1245 denier.

The color uniformity of fiber packages produced by both of the above processes was measured according to the above Test Method. It is surprising that the color uniformity of yarn produced by the multi-feeder process of this invention was at least as good (within experimental error) as that produced from the multi-color master batch process. It had been thought that, in order to achieve acceptable color uniformity in fiber packages, all the colorants had to first be well dispersed in a color master batch. It was not expected that it would be possible to mix several differently colored color concentrates in an extruder with a relatively short hold up time (about 3–10 minutes) and result in fiber packages of acceptable color uniformity.

| FEED TECHNOLOGY | COLOR | # OF SAMPLES | COLOR UNIFORMITY DELTA E CMC (2:1) MEAN |
|---|---|---|---|
| Master Batch* | Weathered Tan | 20 | 0.21 |
| Multi-feeder** | Weathered Tan | 19 | 0.13 |

*comparative example
**process of this invention

We claim:

1. A method for making colored extruded articles of thermoplastic polymers comprising the steps of:
   a) feeding a thermoplastic polymer to an extruder;
   b) feeding at least two differently colored color concentrates to said extruder, each of said color concentrates fed from a separate gravimetric feeder, wherein each color concentrate consists essentially of from about 0.1 to about 70 weight percent of a single colored pigment or dye dispersed in from about 30 weight percent to about 99.9 weight percent of a melt processable polymeric matrix;
   c) melting said thermoplastic polymer and said color concentrates;
   d) mixing said melted thermoplastic polymer with said melted color concentrates to form an extrudable mixture; and
   e) extruding said mixture into an extruded article.

2. The process of claim 1 wherein said thermoplastic polymer is selected from the group consisting of nylon, polyester, polypropylene and copolymers and blends thereof.

3. The process of claim 2 wherein said nylon polymer is selected from the group consisting of nylon 66, nylon 6 and copolymers and blends thereof.

4. The process of claim 1 wherein said melt processable polymeric matrix consists essentially of at least one melt processable polymer selected from the group consisting of nylon, polyester, polypropylene and copolymers and blends thereof.

5. The process of claim 4 wherein said nylon polymer is selected from the group consisting of nylon 66, nylon 6 and copolymers and blends thereof.

6. The process of any one of claims 1–5 wherein said extruded article is a molded part.

7. The process of any one of claims 1–5 wherein said extruded article is fiber.

8. The process of claim 7 wherein the mean color difference along a fiber package, as measured by mean delta E CMC(2:1), is about 0.3 or less.

* * * * *